US008288050B2

(12) United States Patent
Manabe et al.

(10) Patent No.: US 8,288,050 B2
(45) Date of Patent: *Oct. 16, 2012

(54) FUEL CELL SYSTEM

(75) Inventors: Kota Manabe, Toyota (JP); Masahiro Shige, Kaizuka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 576 days.

This patent is subject to a terminal disclaimer.

(21) Appl. No.: 12/083,611

(22) PCT Filed: Nov. 20, 2006

(86) PCT No.: PCT/JP2006/323524
§ 371 (c)(1),
(2), (4) Date: Apr. 15, 2008

(87) PCT Pub. No.: WO2007/063783
PCT Pub. Date: Jun. 7, 2007

(65) Prior Publication Data
US 2009/0130509 A1 May 21, 2009

(30) Foreign Application Priority Data
Nov. 30, 2005 (JP) ................. 2005-345607

(51) Int. Cl.
*H01M 8/00* (2006.01)
*H01M 8/04* (2006.01)
(52) U.S. Cl. ........................ 429/443; 419/444
(58) Field of Classification Search .................. 429/443, 429/444
See application file for complete search history.

(56) References Cited

U.S. PATENT DOCUMENTS

2003/0211372 A1* 11/2003 Adams et al. .................. 429/23
2005/0123809 A1* 6/2005 Saunders et al. ............... 429/13

FOREIGN PATENT DOCUMENTS

| JP | 61-165966 A | | 7/1989 |
|---|---|---|---|
| JP | 8-138711 A | | 5/1996 |
| JP | 08138710 A | * | 5/1996 |
| JP | 11-219715 A | | 8/1999 |
| JP | 11-345624 A | | 12/1999 |
| JP | 2000-08845 A | | 2/2000 |
| JP | 2000-048845 A | | 2/2000 |
| JP | 2000048845 A | * | 2/2000 |
| JP | 2000-208162 A | | 7/2000 |
| JP | 2002-500421 A | | 1/2002 |

(Continued)

OTHER PUBLICATIONS

Machine translation of JP 2000048845A—Feb. 2002.*

*Primary Examiner* — Gregg Cantelmo
(74) *Attorney, Agent, or Firm* — Kenyon & Kenyon LLP

(57) ABSTRACT

There is disclosed a fuel cell system in which a poisoned electrode catalyst can be recovered while meeting a demand for an output power. When a controller detects that an electrode catalyst is poisoned, the controller derives a target operation point adequate for recovering a function of the poisoned electrode catalyst to realize shift of an operation point so that the output power is kept constant. Specifically, a fuel cell voltage is controlled using a DC/DC converter, and an amount of an oxidizing gas to be fed from an oxidizing gas supply source is adjusted, thereby controlling a fuel cell current.

5 Claims, 6 Drawing Sheets

FOREIGN PATENT DOCUMENTS

| | | |
|---|---|---|
| JP | 2003-504807 A | 2/2003 |
| JP | 2003-068343 A | 3/2003 |
| JP | 2003-115318 A | 4/2003 |
| JP | 2003-142134 A | 5/2003 |
| JP | 2003-536232 A | 12/2003 |
| JP | 2004-039527 A | 2/2004 |
| JP | 2004-342406 A | 12/2004 |
| JP | 2006-128016 A | 5/2006 |

* cited by examiner

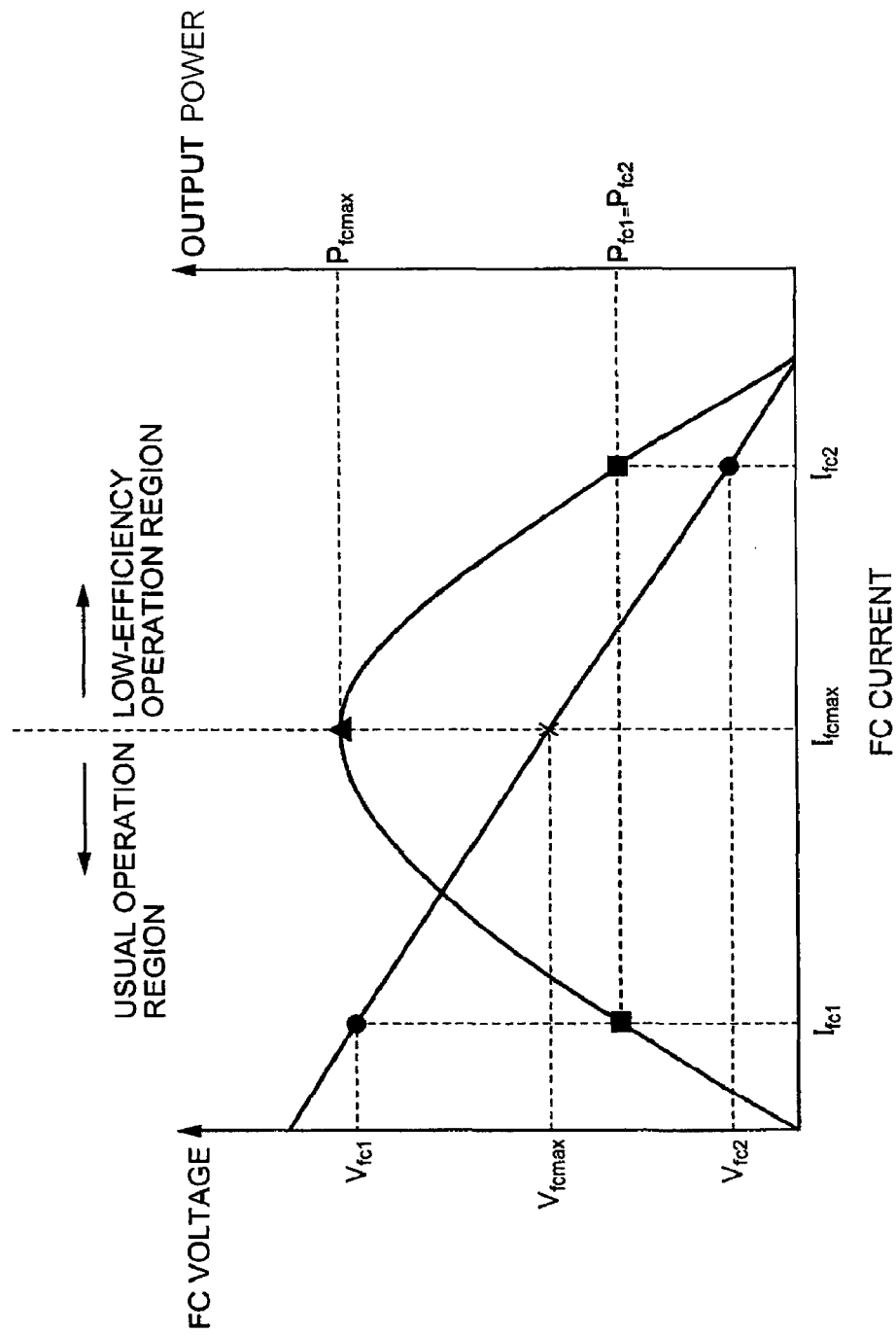

FUEL CELL SYSTEM

This is a 371 national phase application of PCT/JP2006/323524 filed 20 Nov. 2006, which claims priority of Japanese Patent Application No. 2005-345607 filed 30 Nov. 2005, the contents of which are incorporated herein by reference.

TECHNICAL FIELD

The present invention relates to a fuel cell system.

BACKGROUND ART

In general, there are various restrictions on actuation of a fuel cell as compared with another power source. A power generation efficiency of such a fuel cell decreases owing to lowering of a temperature and poisoning of an electrode catalyst, and hence a desired voltage/current cannot be supplied so that an apparatus cannot be actuated in some cases.

In view of such a situation, a method is suggested in which when the fuel cell is started, at least one of an anode fuel (e.g., a fuel gas) and a cathode fuel (e.g., an oxidizing gas) to be fed to electrodes is brought into a shortage state, and an overvoltage of a part of the electrodes is increased to generate further heat. In consequence, the temperature of the fuel cell is raised, and a poisoned electrode catalyst and the like are recovered (e.g., see Patent Document 1).

[Patent Document 1] Japanese Patent Publication No. 2003-504807

DISCLOSURE OF THE INVENTION

However, deterioration of cell characteristics due to a poisoned electrode catalyst and lowering of a temperature of a fuel cell occurs during not only starting but also a usual operation. Therefore, when the poisoned electrode catalyst is recovered only during the starting as described above, the cell characteristics deteriorate owing to the poisoned electrode catalyst and the like generated during the usual operation, and a demanded power cannot be output. Moreover, in the above constitution, an operation to recover the poisoned electrode catalyst and the like is performed regardless of the demanded power during the starting, and hence there has been a problem that power generation in accordance with the demanded power cannot be started instantly.

The present invention has been developed in view of the above-mentioned situation, and an object thereof is to provide a fuel cell system in which a function of a poisoned electrode catalyst and the like can be recovered while meeting a demand for an output power.

To solve the above-mentioned problem, a fuel cell system according to the present invention is a fuel cell system comprising a fuel cell in which an electrode having an electrolyte and a catalyst and a separator are laminated; and operation control means for controlling an operation of the fuel cell at a usual operation point to output a power in response to a demand for power generation, the system further comprising: judgment means for judging whether or not an operation to recover deterioration of the catalyst of the electrode is required, the operation control means being configured to operate at a low-efficiency operation point which outputs the power in response to the demand for the power generation and which has a power loss larger than that of the usual operation point, in a case where the judgment result is affirmative.

According to such a constitution, even when the electrode catalyst deteriorates, a function of the poisoned electrode catalyst can be recovered while meeting the demand for the output power. Here, the "deterioration of the electrode catalyst" includes such deterioration that the function of the catalyst cannot physically or chemically be recovered, and such deterioration that the function of the catalyst is temporarily recovered owing to applied energy (e.g., poisoning of the catalyst (a noble metal) and aggregation thereof (a phenomenon in which noble metals come close to each other)). According to the present invention, the lowered function of the catalyst due to the recoverable catalyst deterioration is recovered.

Here, in the above constitution, when the judgment result is negative, the operation control means operates at the usual operation point to output the power in response to the demand for the power generation. On the other hand, when the judgment result is affirmative, the means may operate at the low-efficiency operation point which outputs the power in response to the demand for the power generation and which has the power loss larger than that of the usual operation point.

Moreover, in a preferable aspect of the above constitution, when the operation control means operates at the usual operation point and the judgment means performs the affirmative judgment, the operation is switched to the low-efficiency operation point without changing the output power of the fuel cell.

Furthermore, in the preferable aspect, the operation control means includes a voltage conversion device which controls an output voltage of the fuel cell, and adjustment means for adjusting an amount of a reactive gas to be fed to the fuel cell, the voltage conversion device controls the output voltage of the fuel cell, and the adjustment means adjusts the amount of the reactive gas to be fed, to control an output current of the fuel cell, whereby the operation is switched to the low-efficiency operation point without changing the output voltage of the fuel cell.

Moreover, in the preferable aspect, the system further comprises detection means for detecting whether or not the catalyst of the fuel cell is poisoned, and the judgment means judges that the operation to recover the deterioration of the catalyst of the electrode is required in a case where it is detected that the catalyst is poisoned.

Furthermore, in the preferable aspect, the detection means compares an electric characteristic as a set standard with an electric characteristic of the fuel cell at the time, to detect whether or not the catalyst is poisoned.

In addition, a fuel cell system according to the present invention is a fuel cell system comprising a fuel cell in which an electrode having an electrolyte and a catalyst and a separator are laminated; and operation control means for controlling an operation of the fuel cell at a usual operation point to output a power in response to a demand for power generation, the system further comprising: judgment means for judging whether or not a warm-up operation is required, the operation control means being configured to operate at a low-efficiency operation point which outputs the power in response to the demand for the power generation and which has a power loss larger than that of the usual operation point, in a case where the judgment result is affirmative. Thus, the present invention is applicable to not only a case where a function of the poisoned electrode catalyst is recovered but also a case where the fuel cell is warmed up.

As described above, according to the present invention, the deteriorated electrode catalyst and the like can be recovered while meeting the demand for the output power.

BRIEF DESCRIPTION OF THE DRAWINGS

FIG. 3 is a diagram showing changes of the output power according to the embodiment;

BEST MODE FOR CARRYING OUT THE INVENTION

An embodiment according to the present invention will hereinafter be described with reference to the drawings.

A. Present Embodiment

Figure 1:
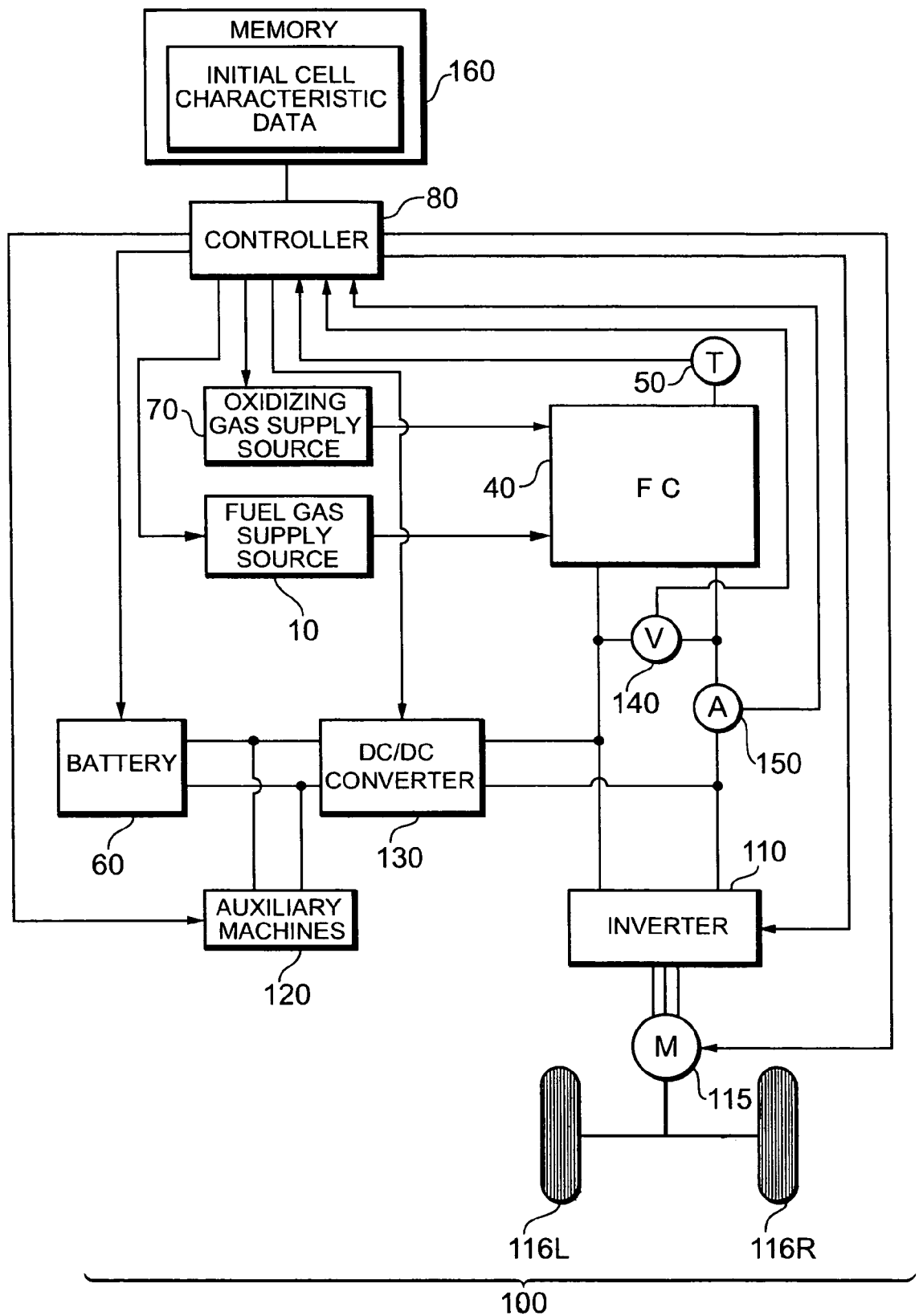
FIG. 1 is a diagram showing a constitution of a main part of a fuel cell system according to the present embodiment.

FIG. 1 is a diagram showing a constitution of a main part of a fuel cell system 100 according to the present embodiment. In the present embodiment, a fuel cell system is assumed which is to be mounted on vehicles such as a fuel cell hybrid vehicle (FCHV), an electric car and a hybrid car, but the system is applicable to not only the vehicles but also various mobile bodies (e.g., a ship, an airplane, a robot, etc.) and a stationary power source.

A fuel cell 40 is means for generating power from a reactive gas (a fuel gas and an oxidizing gas) to be fed, and a fuel cell of any type such as a solid polymer type, a phosphate type or a dissolving carbonate type can be used. The fuel cell 40 has a stack structure in which a plurality of unitary cells including an MEA and the like are laminated in series. An output voltage (hereinafter referred to as the FC voltage) and an output current (hereinafter referred to as the FC current) of this fuel cell 40 are detected by a voltage sensor 140 and a current sensor 150, respectively. A fuel gas such as a hydrogen gas is fed from a fuel gas supply source 10 to a fuel pole (an anode) of the fuel cell 40, whereas an oxidizing gas such as air is fed from an oxidizing gas supply source 70 to an oxygen pole (a cathode).

The fuel gas supply source 10 is constituted of, for example, a hydrogen tank, various valves and the like, and valve open degrees, ON/OFF time and the like are adjusted to control an amount of the fuel gas to be fed to the fuel cell 40.

The oxidizing gas supply source 70 is constituted of, for example, an air compressor, a motor which drives the air compressor, an inverter and the like, and a rotation number of the motor and the like are adjusted to adjust an amount of the oxidizing gas to be fed to the fuel cell 40.

A battery 60 is a chargeable/dischargeable secondary cells and constituted of, for example, a nickel hydrogen battery or the like. Needless to say, instead of the battery 60, a chargeable/dischargeable accumulator (e.g., a capacitor) may be disposed except the secondary cell. This battery 60 and the fuel cell 40 are connected in parallel to an inverter 110 for a traction motor, and a DC/DC converter 130 is provided between the battery 60 and the inverter 110

The inverter 110 is, for example, a PWM inverter of a pulse width modulation system, and converts a direct-current power output from the fuel cell 40 or the battery 60 into a three-phase alternate-current power in response to a control command given from a controller 80, to supply the power to a traction motor 115. The traction motor 115 is a motor to drive wheels 116L, 116R, and the rotation number of such a motor is controlled by the inverter 110.

The DC/DC converter (a voltage conversion device) 130 is a full bridge converter constituted of, for example, four power transistors and a drive circuit for exclusive use (both are not shown). The DC/DC converter 130 has a function of raising or lowering a DC voltage input from the battery 60 to output the voltage toward the fuel cell 40, and a function of raising or lowering a DC voltage input from the fuel cell 40 or the like to output the voltage toward the battery 60. The functions of the DC/DC converter 130 realize charging/discharging of the battery 60.

Auxiliary machines 120 such as vehicle auxiliary machines and FC auxiliary machines are connected between the battery 60 and the DC/DC converter 130. The battery 60 is a power source for these auxiliary machines 120. It is to be noted that the vehicle auxiliary machines are various power apparatuses for use in operating the vehicle and the like (a lighting apparatus, an air conditioner, a hydraulic pump, etc.), and the FC auxiliary machines are various power apparatuses for use in operating the fuel cell 40 (pumps for feeding the fuel gas and the oxidizing gas, etc.).

The controller 80 is constituted of a CPU, an ROM, an RAM and the like, and system sections are centrically controlled based on sensor signals input from a temperature sensor 50 which detects a temperature of the fuel cell 40, an SOC sensor which detects a charged state of the battery 60, an accelerator pedal sensor which detects an open degree of an accelerator pedal and the like.

Moreover, the controller 80 detects by the following method whether or not an electrode catalyst of the fuel cell 40 is poisoned, and performs processing to switch an operation point of the fuel cell 40 so as to recover characteristics of the poisoned electrode catalyst (described later).

A memory 160 is, for example, a writable nonvolatile memory in which initial cell characteristic data indicating cell characteristics in an initial state (e.g., during shipping of a manufactured cell) of the fuel cell 40 and the like are stored. The initial cell characteristic data is a two-dimensional map showing a relation between a current density and a voltage of the fuel cell 40 in the initial state, and the voltage lowers as the current density increases.

As is known, when the electrode catalyst of the fuel cell 40 is poisoned, the cell characteristics lower. With the equal voltage, the current density after poisoning decreases as compared with that before the poisoning (the current density indicated by the initial cell characteristic data). In the present embodiment, the FC voltage and the FC current detected by the voltage sensor 140 and the current sensor 150 are compared with the initial cell characteristic data by use of the above-mentioned characteristics, to detect whether or not the electrode catalyst is poisoned. More specifically, when the voltage sensor 140 and the current sensor 150 detect the FC voltage and the FC current, the controller (detection means) 80 compares the detection result with the current density at the equal voltage in the initial cell characteristic data. As a result of such comparison, when the following formulas (1), (2) are established, it is judged that the electrode catalyst is poisoned. On the other hand, when the following formulas (1), (2) are not established, it is judged that the electrode catalyst is not poisoned.

$$Vfc = Vs \qquad (1), \text{and}$$

$$Ifc < Is + \alpha \qquad (2),$$

in which Vfc; an FC voltage,

Vs; a voltage in the initial cell characteristic data,

Ifc; an FC current,

Is; a current density in the initial cell characteristic data, and

α; a predetermined value.

It is to be noted that in the above description, it is detected using the initial cell characteristic data whether or not the electrode catalyst is poisoned, but needless to say, it may be detected by another method whether or not the electrode catalyst is poisoned. For example, when the electrode catalyst is poisoned by carbon monoxide, a known CO concentration sensor is provided, and a relation between a CO concentration and a measured voltage value may beforehand be inspected and mapped to detect, based on the detected CO concentration or the like, whether or not the electrode catalyst is poisoned. The operation point of the fuel cell 40 will hereinafter be described with reference to the drawing.

Figure 2A:
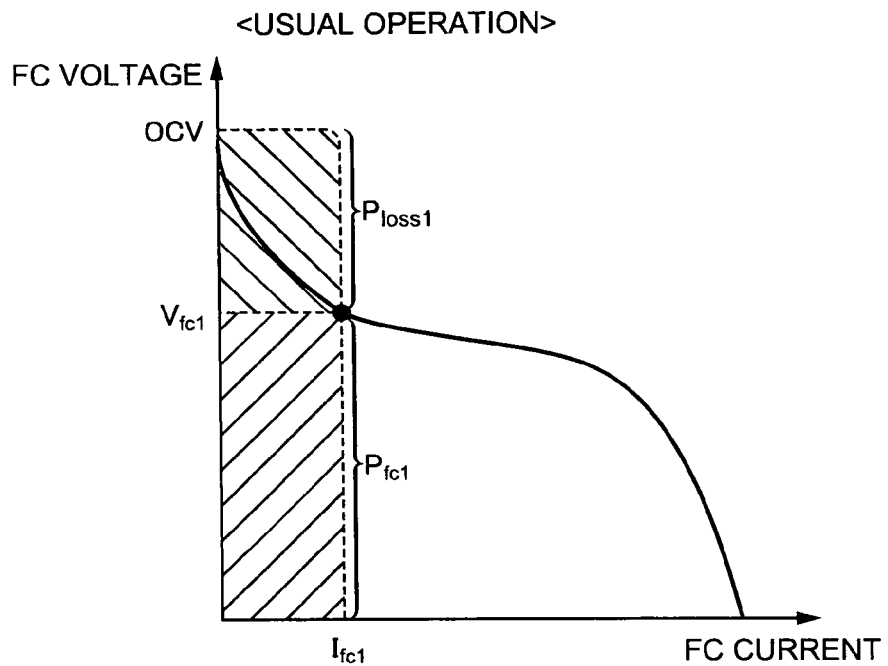
FIG. 2A is a diagram showing a relation between an output power and a power loss according to the embodiment.
Figure 2B:
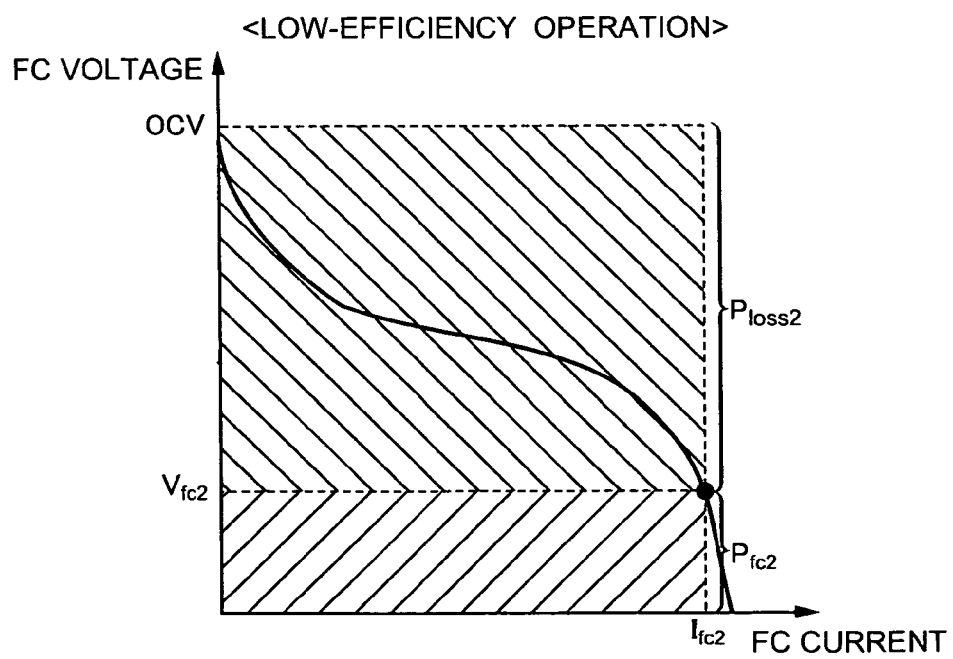
FIG. 2B is a diagram showing a relation between the output power and the power loss according to the embodiment.

FIGS. 2A and 2B are diagrams showing a relation between an output power and a power loss at a time when the fuel cell is operated at different operation points. The abscissa indicates the FC current and the ordinate indicates the FC voltage. Moreover, an open circuit voltage (OCV) shown in FIGS. 2A and 2B is a voltage in a state in which any current is not passed through the fuel cell.

The fuel cell 40 capable of obtaining the current and voltage characteristics (hereinafter referred to as the IV characteristic) shown in FIGS. 2A and 2B is usually operated at an operation point (Ifc1, Vfc1) at which the power loss is small with respect to the output power (see FIG. 2A). However, when the electrode catalyst of the fuel cell 40 is poisoned, an inner temperature of the fuel cell 40 needs to be raised to recover the function of the electrode catalyst. Therefore, in the present embodiment, the operation of the fuel cell shifts to an operation point (Ifc2, Vfc2) having a large power loss while securing a necessary output power, thereby recovering the function of the poisoned electrode catalyst (see FIG. 2B). Here, output powers Pfc at the operation points shown in FIGS. 2A and 2B, a power loss Ploss, a relation between the output powers Pfc and a relation between the power losses Ploss are as follows.

<Concerning the Operation Point (Ifc, Vfc1)>

$$Ifc1 * Vfc1 = Pfc1 \quad (3)$$

$$Ifc1 * OCV - Pfc1 = Ploss1 \quad (4)$$

<Concerning the Operation Point (Ifc2, Vfc2)>

$$Ifc2 * Vfc2 = Pfc2 \quad (5)$$

$$Ifc2 * OCV - Pfc2 = Ploss2 \quad (6)$$

<Relations Between the Output Powers and Between the Power Losses>

$$Pfc1 = Pfc2 \quad (7)$$

$$Ploss1 < Ploss2 \quad (8)$$

FIG. 3 is a diagram showing changes of the output power at a time when the fuel cell is operated while the operation point is shifted. The abscissa indicates the FC current, and the ordinate indicates the FC voltage and the output power. It is to be noted that in FIG. 3, for the sake of convenience, the IV characteristic of the fuel cell is shown with a straight line (hereinafter referred to as the IV line). Operation points (Ifc1, Vfc1), (Ifc2, Vfc2) on the IV line correspond to the operation points (Ifc1, Vfc1), (Ifc2, Vfc2) shown in FIGS. 2A and 2B.

As shown in FIG. 3, with regard to the output power Pfc of the fuel cell 40, as the FC voltage Vfc decreases, the output power Pfc increases at an operation point on the IV line shown on the left side of a maximum output operation point (Ifcmax, Vfcmax) at which a maximum output power Pfcmax is obtained. On the other hand, at an operation point on the IV line shown on the right side of the maximum output operation point, the output power Pfc decreases, as the FC voltage Vfc decreases.

As described above, the power loss Ploss increases, as the FC voltage Vfc decreases. Therefore, even when the fuel cell 40 is operated to output the equal power, the power loss Ploss is large in a case where the fuel cell is operated at the operation point on the IV line shown on the right side of the maximum output operation point (e.g., the operation point (Ifc2, Vfc2)) as compared with a case where the fuel cell is operated at the operation point on the IV line shown on the left side of the maximum output operation point (e.g., the operation point (Ifc1, Vfc1)). Therefore, in the following description, the operation point on the IV line at which the output power Pfc increases with the decrease of the FC voltage Vfc is defined as a usual operation point, and the operation point on the IV line at which the output power Pfc decreases with the decrease of the FC voltage Vfc is defined as a low-efficiency operation point. It is to be noted that the usual operation point and the low-efficiency operation point are as follows.

<Concerning the Usual Operation Point (Ifc, Vfc)>

$$Ifc \leq Ifcmax \quad (9)$$

$$Vfcmax \leq Vfc \quad (10)$$

<Concerning the Low-Efficiency Operation Point (Ifc, Vfc)>

$$Ifcmax < Ifc \quad (11)$$

$$Vfc < Vfcmax \quad (12)$$

Next, the operation point shift processing to be executed by the controller 80 will be described with reference to FIG. 4 and the like.

Figure 4:
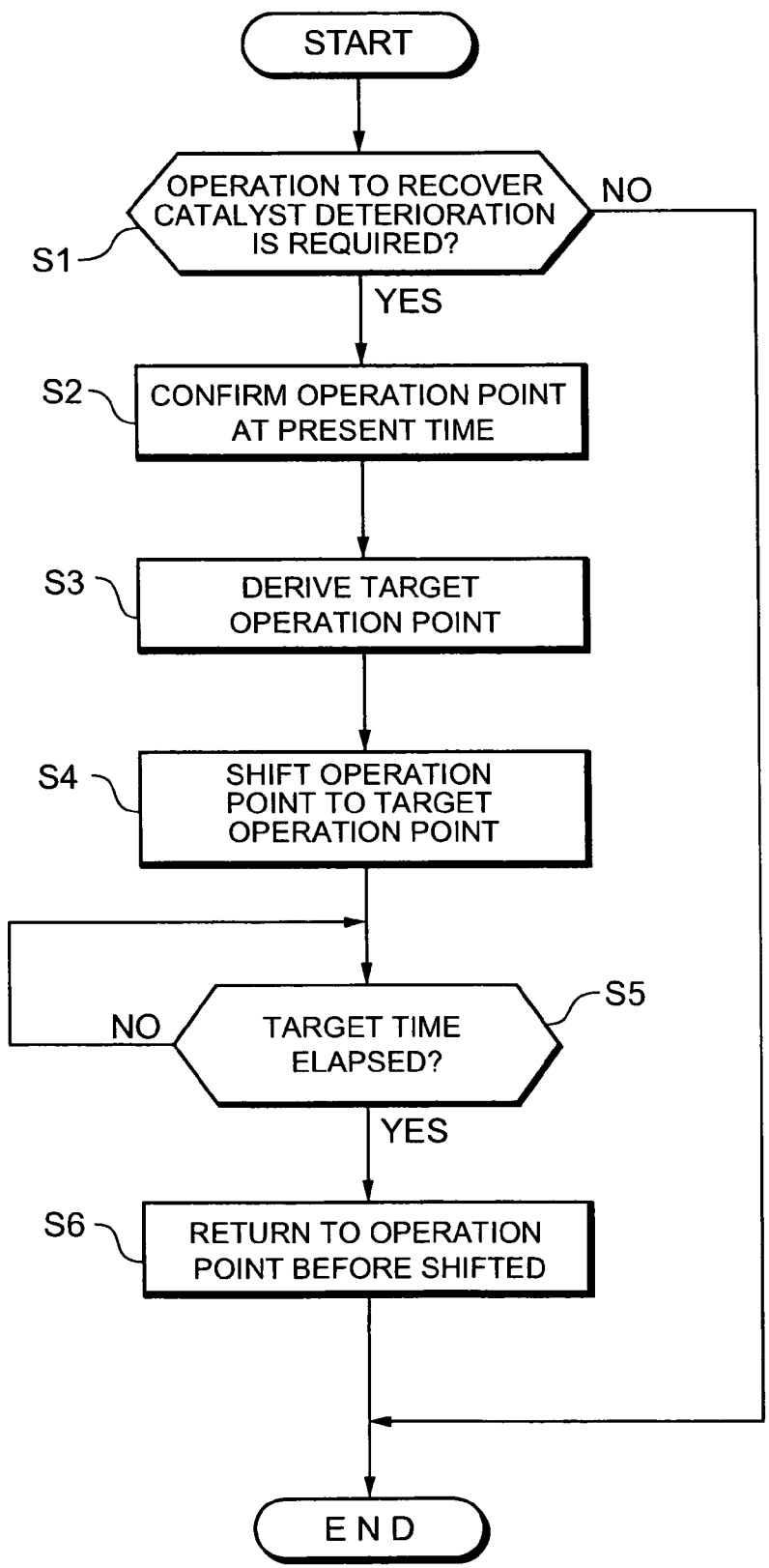
FIG. 4 is a flow chart showing shift processing of an operation point according to the embodiment.
Figure 5A:
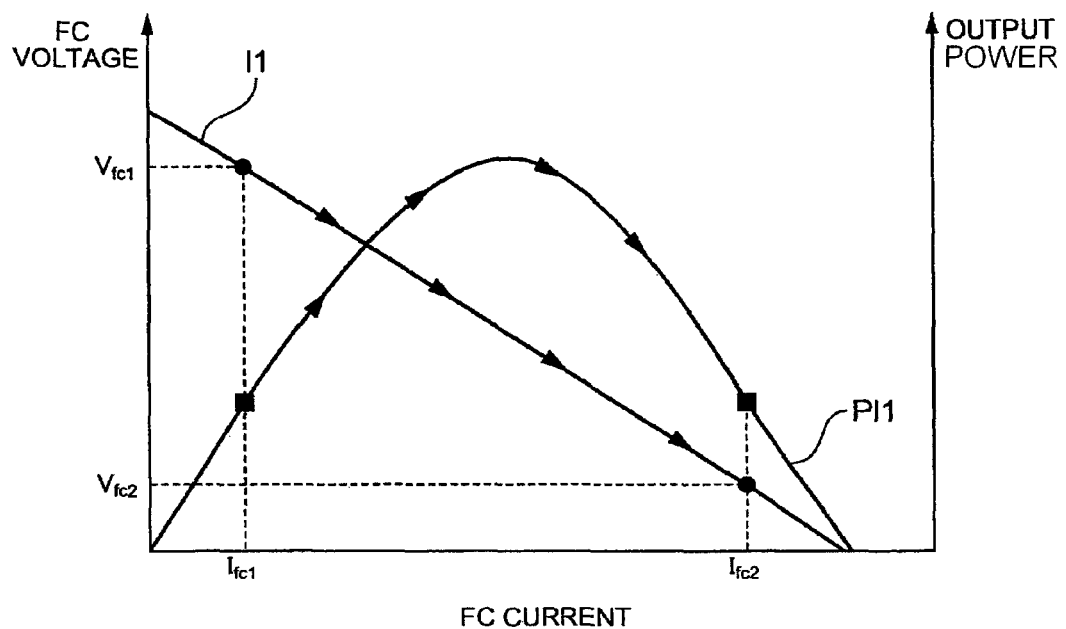
FIG. 5A is a diagram showing changes of the output power according to the embodiment.
Figure 5B:
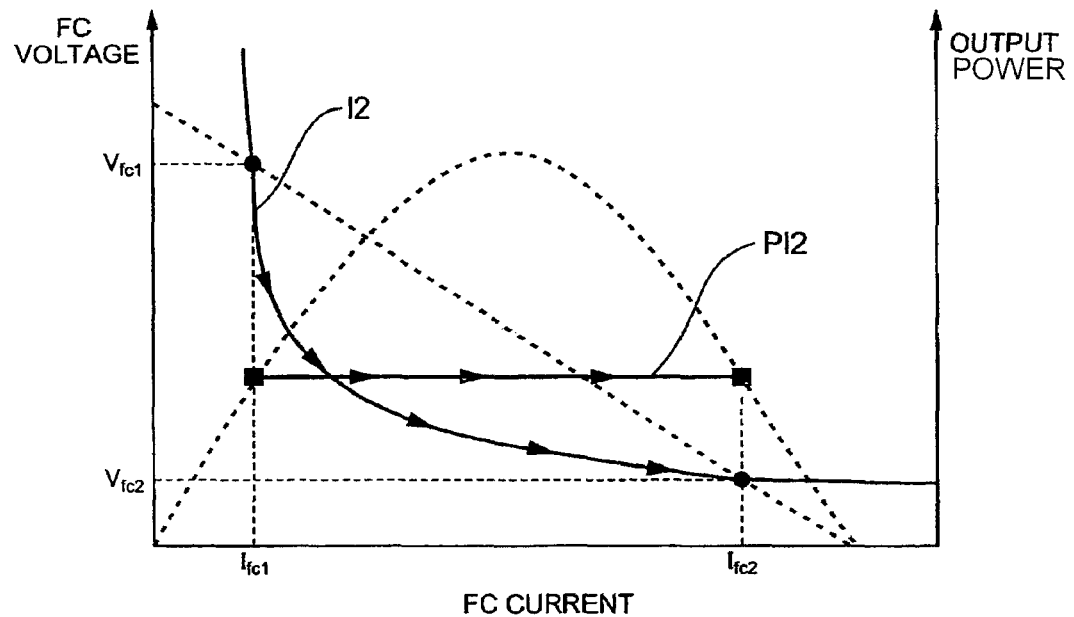
FIG. 5B is a diagram showing changes of the output power according to the embodiment.

FIG. 4 is a flow chart showing the shift processing of the operation point, and FIGS. 5A and 5B are diagrams showing changes of the output power at a time when the operation point is shifted. It is to be noted that in the following description, it is assumed a case where the operation point of the fuel cell 40 is shifted from the usual operation point (Ifc1, Vfc1) to the low-efficiency operation point (Ifc2, Vfc2) in order to recover the function of the poisoned electrode catalyst (see FIGS. 5A and 5B).

The controller (judgment means) 80 first judges whether or not an operation to recover catalyst deterioration is required (step S1). Specifically, the FC voltage and the FC current detected by the voltage sensor 140 and the current sensor 150 are compared with the initial cell characteristic data to detect whether or not the electrode catalyst is poisoned. When the electrode catalyst is not poisoned, it is judged that the operation to recover the catalyst deterioration is not required. On the other hand, when the electrode catalyst is poisoned, it is judged that the operation to recover the catalyst deterioration is required.

When the electrode catalyst is not poisoned, the controller (operation control means) 80 continues operating at such a usual operation point as to output the power in response to system demand (demand for power generation). On the other hand, when the electrode catalyst is poisoned, the controller 80 first confirms the operation point (here, the usual operation point (Ifc1, Vfc1)) at the present time (step S2).

Subsequently, the controller 80 derives an adequate operation point (the target operation point) of the fuel cell 40 so as to recover the function of the poisoned electrode catalyst (step S3). One example will be described. For example, when the fuel cell is operated at the usual operation point (Ifc1, Vfc1) to obtain the output power Pfc1, the low-efficiency operation point (Ifc2, Vfc2) capable of obtaining the output power Pfc2 (=Pfc1) equal to the above output power is derived as the target operation point. It is to be noted that in the poisoned electrode catalyst, a cell voltage of the fuel cell 40 is controlled into 0.6 V or less, whereby a catalyst reducing reaction occurs to recover the catalyst function. Therefore, the operation point which satisfies such conditions may be derived as the target operation point (details will be described later).

The controller (the operation control means) 80 starts shift of the operation point, when the target operation point is derived (step S4). Here, in a case where the only FC voltage is controlled to shift the operation point from the usual operation point (Ifc1, Vfc1) to the low-efficiency operation point (Ifc2, Vfc2), as shown in FIG. 5A, the output power of the fuel cell 40 largely fluctuates in response to the shift of the operation point of an IV line I1 (see a power line pl1). More specifically, in a case where the only FC voltage is controlled using the DC/DC converter 130 to shift the operation point, in a shift process, there occurs necessity of performing a high-output operation (an operation at the maximum output operation point) which might not be performed under a usual use environment.

To solve the problem, in the present embodiment, the FC current is controlled together with the FC voltage to realize the shift of the operation point from the usual operation point (Ifc1, Vfc1) to the low-efficiency operation point (Ifc2, Vfc2) so that the output power is kept constant (see a power line pl2. Specifically, the FC voltage is controlled using the DC/DC converter (a voltage conversion device) 130, and the controller (adjustment means) 80 adjusts an amount of the oxidizing gas to be fed from the oxidizing gas supply source 70 (here, reduces the amount of the oxidizing gas), to control the FC current. Such control is performed, whereby the IV characteristic of the fuel cell 40 shifts from the IV line I1 to an IV line I2, and the output power of the fuel cell 40 is kept constant regardless of the shift of the operation point.

When the operation point is shifted, the controller 80 judges with reference to a timer (not shown) or the like whether or not a target set time has elapsed since the operation point was shifted (step S5). Here, the target set time is time (e.g., 10 seconds) adequate for recovering the function of the electrode catalyst, which has elapsed since the operation was started at the low-efficiency operation point, and can be obtained in advance by an experiment or the like. On judging that the target set time has not elapsed (step S5; NO), the controller 80 repeatedly executes the step S5. On the other hand, on judging that the target set time has elapsed (step S5; YES), the controller 80 returns the shifted operation point to the operation point before shifted (step S6), thereby ending the processing.

As described above, according to the fuel cell system of the present embodiment, the function of the poisoned electrode catalyst can be recovered while meeting the demand for the output power.

It is to be noted that as described above, with regard to the poisoned electrode catalyst, the cell voltage of the fuel cell 40 is controlled into 0.6 V or less to recover the function of the catalyst, so that the operation point may be derived as follows.

For example, in a case where the fuel cell 40 has a stack structure in which 300 cells are laminated and a required output power is 1 kW, if the cell voltage is set to 0.5 V (<0.6 V), the target operation point is as follows.

<Concerning the Target Operation Point (Ifc, Vfc)>

$$Vfc = 300*0.5 = 150 \text{ V} \quad (13)$$

$$Ifc = 1000/150 = 6.7 \text{ A} \quad (14)$$

Here, even in a case where the obtained target operation point is not present on the IV line before shifted, the FC current is controlled together with the FC voltage to change the IV characteristic, whereby the obtained target operation point can be positioned on the IV line.

B. Modification (1) In the above embodiment, the amount of the oxidizing gas to be fed from the oxidizing gas supply source 70 is adjusted to control the FC current. However, an amount of a fuel gas to be fed from a fuel gas supply source 10 may be adjusted to control the FC current.

(2) In the above embodiment, in a case where it is detected that the electrode catalyst is poisoned, the operation point of the fuel cell 40 is shifted from the usual operation point to the low-efficiency operation point, but the operation point may be shifted at the following timing.

For example, a fuel cell may be operated once at a low-efficiency operation point during actuation of a system, and then the operation point may be shifted to a usual operation point to perform a system operation in a state in which a function of a catalyst is constantly raised. When a demanded output power is a predetermined value or less (e.g., around an idle output or the like), the operation point may be shifted from the usual operation point to the low-efficiency operation point. Furthermore, after the system stops, the operation may be performed at the low-efficiency operation point to recover the deteriorated function of the catalyst during the operation in preparation for the next actuation.

(3) In the above embodiment, it is constituted that the operation point of the fuel cell 40 is shifted from the usual operation point to the low-efficiency operation point in order to recover the function of the poisoned electrode catalyst, but the present invention is applicable to any case that requires a warm-up operation, for example, a case where the warm-up operation is performed during the actuation at a low temperature, a case where the warm-up operation is rapidly performed before the stop of the system operation and the like.

One example will be described. On receiving an actuation command of the system from an operation switch or the like, a controller 80 detects an inner temperature of a fuel cell 40 by use of a temperature sensor 50 or the like. The controller (judgment means) 80 judges that the warm-up operation is required in a case where the inner temperature of the fuel cell 40 is below a preset threshold temperature, and the shift processing of the operation point shown in FIG. 4 is executed. The subsequent operation is similar to that of the present embodiment, and hence description thereof is omitted. It is to be noted that instead of the temperature sensor 50, a temperature sensor to detect an outside air temperature, a temperature sensor to detect a temperature of a refrigerant flowing through a cooling mechanism (not shown) or the like may be used.

Figure 6:
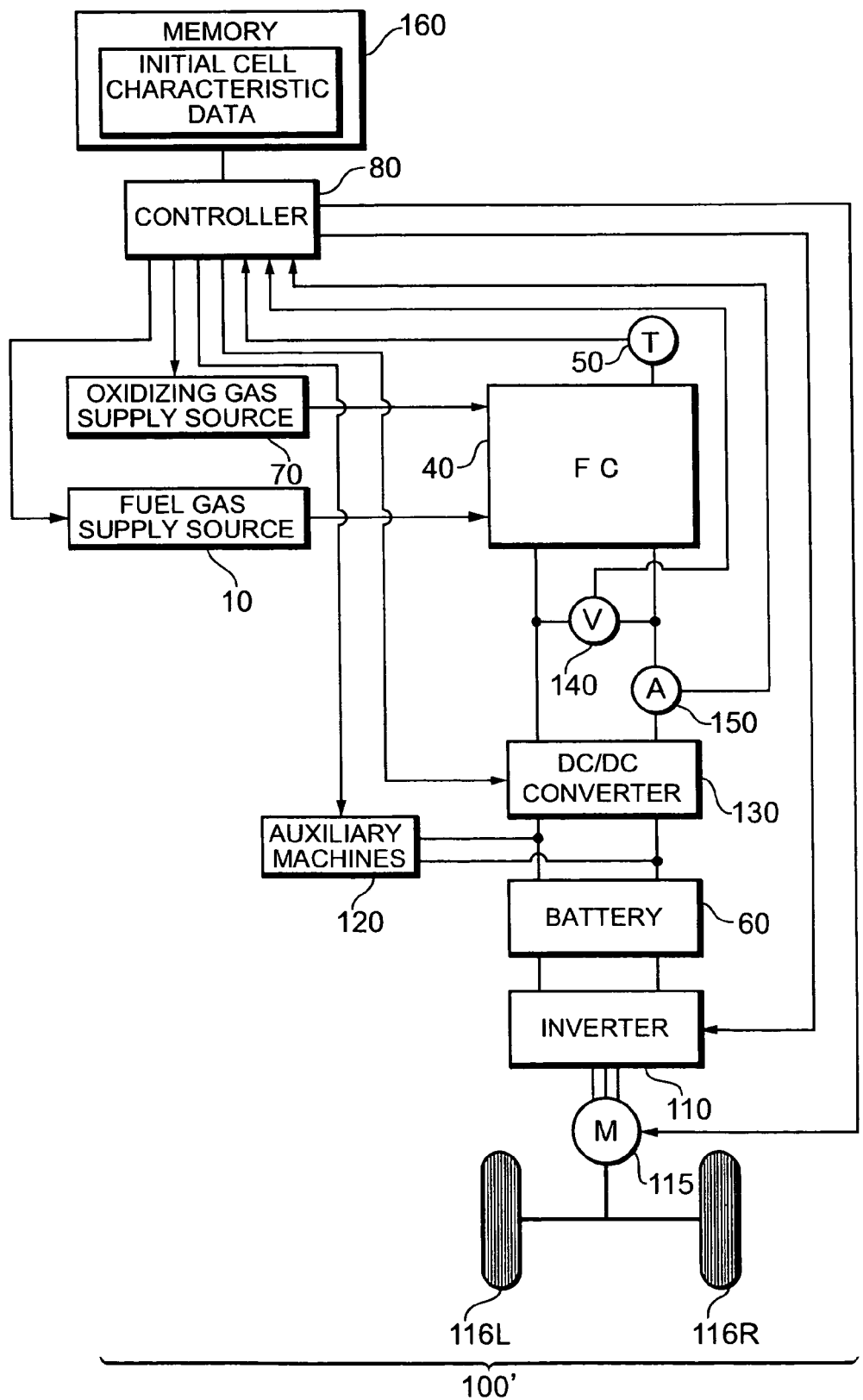
FIG. 6 is a diagram showing a constitution of a main part of a fuel cell system according to a modification.

(4) In the above embodiment, a constitution in which an output end of the fuel cell is connected to the inverter 110 for the traction motor has been described as an example. However, for example, as shown in FIG. 6, an output end of a battery 60 may be connected to the inverter 110 for the traction motor. It is to be noted that in a fuel cell system 100' shown in FIG. 6, components corresponding to those of the fuel cell system 100 shown in FIG. 1 are denoted with the same reference numerals, and detailed description thereof is omitted. Moreover, in the above embodiment of the present invention, a hybrid power source system including the fuel cell 40 and the battery 60 has been described as an example, but the present invention is also applicable to a power source system including the fuel cell 40 only.

The invention claimed is:

1. A fuel cell system, comprising:
a fuel cell including a pair of opposing electrodes having an electrolyte and a catalyst;
an operation control device for controlling an operation of the fuel cell at a usual operation point to output a power in response to a demand for power generation; and
a judgment device programmed to judge whether or not an operation to recover deterioration of the catalyst of an electrode of the pair of opposing electrodes is required, when the fuel cell is operated at the usual operation point,
the operation control device being programmed to operate the fuel cell at a low-efficiency operation point which outputs the power equal to the demand for the power generation when the fuel cell is operated at the usual operation point, and which has a power loss from an open circuit voltage power larger than that of the usual operation point when the fuel cell is operated at the usual operation point and the judgment result of the judgment device is affirmative.

2. The fuel cell system according to claim 1, wherein the operation control device is programmed to switch the operation of the fuel cell to the low-efficiency operation point without changing the output power of the fuel cell when the operation control device operates the fuel cell at the usual operation point and the judgment device performs the affirmative judgment.

3. The fuel cell system according to claim 2, wherein the operation control device includes a voltage conversion device which controls an output voltage of the fuel cell, and an adjustment device for adjusting an amount of a reactive gas to be fed to the fuel cell, the voltage conversion device controls the output voltage of the fuel cell, and the adjustment device adjusts the amount of the reactive gas to be fed, to control an output current of the fuel cell, whereby the operation is switched to the low-efficiency operation point without changing the output voltage of the fuel cell.

4. The fuel cell system according to claim 3, wherein the judgment device detects whether or not the catalyst of the fuel cell is poisoned, and judges that the operation to recover the deterioration of the catalyst of the electrode is required in a case where it is detected that the catalyst is poisoned.

5. The fuel cell system according to claim 4, wherein the judgment device compares an electric characteristic as a set standard with an electric characteristic of the fuel cell at the time, to detect whether or not the catalyst is poisoned.

* * * * *